United States Patent [19]

McCoy

[11] 4,066,543

[45] Jan. 3, 1978

[54] CONTINUOUS PROCESS FOR NON-CATALYTIC OXIDATION OF SULFITE-CONTAINING WATERS

[75] Inventor: Drew E. McCoy, Nederland, Tex.

[73] Assignee: Texaco Inc., New York, N.Y.

[21] Appl. No.: 631,257

[22] Filed: Nov. 12, 1975

[51] Int. Cl.² ............................................. C02C 5/04
[52] U.S. Cl. .................................... 210/63 R; 162/36
[58] Field of Search ...................... 162/31, 36; 210/50, 210/56, 63 R; 423/544

[56] References Cited

U.S. PATENT DOCUMENTS

| | | | |
|---|---|---|---|
| 2,640,758 | 6/1953 | Aries et al. ............................... | 162/31 |
| 2,665,249 | 1/1954 | Zimmerman ............................ | 162/31 |
| 3,178,260 | 4/1965 | Tirado ................................ | 210/63 R |
| 3,761,409 | 9/1973 | McCoy et al. ...................... | 210/63 R |

Primary Examiner—Thomas G. Wyse
Attorney, Agent, or Firm—Thomas H. Whaley; Carl G. Ries; Henry W. Archer

[57] ABSTRACT

Waste water streams containing sulfite and bisulfite ions but substantially no sulfide or thiosulfate ions are treated to convert sulfites to sulfates which can be discharged in receiving streams with no concomitant increase in Chemical or Biological Oxygen Demand. The process is a non-catalytic oxidation effected at 25 to 50 psi, 175°–250° F using from 50 to 350 percent excess of oxygen when utilizing air or any suitable oxygen containing gas basis stoichiometric conversion of sulfite to sulfate.

10 Claims, No Drawings

CONTINUOUS PROCESS FOR NON-CATALYTIC OXIDATION OF SULFITE-CONTAINING WATERS

BACKGROUND OF THE INVENTION

1. Field of the Invention

This invention relates generally to air and water pollution abatememt and more particularly to a continuous, liquid phase, air oxidation process for converting sulfites and bisulfites present in waste water streams to non-polluting, non-oxygen demanding sulfates. The process of the invention is particularly suitable for treating sulfur recovery unit tail gas scrubbing liquors and sea water containing sulfite which has been used for scrubbing flue gas used for tanker inerting operations.

2. Statement of the Prior Art

In numerous industrial processes, notably in the petroleum and paper industries which produce waste streams containing sulfur compounds, problems of disposal frequently arise. These compounds are usually in the form of sulfides, polythionates or thiosulfates. Earlier methods of disposing of such compounds frequently consisted of limited treatment or simply dumping the untreated wastes, without regard to their Chemical or Biological Oxygen Demands, into receiving waters; or steam stripping and flaring hydrogen sulfide to produce $SO_2$ which was released to the atmosphere. Such practices have been restricted around the world and various techniques are now being used to provide less polluting effluents. In some processes where sulfur is available as $SO_2$ gas, as for example, in the tail gas of a sulfur recovery unit, the gases can be scrubbed with NaOH, $NH_4OH$ or other suitable basic aqueous medium to remove the $SO_2$. The present process provides an efficient way for treating the resulting (or "scrubbing") liquor which contains sulfite or bisulfite anions in association with sodium, ammonium or other cations.

In a related development, in the technique of inerting cargo tanks of oil tankers, flue gas from the ship's boilers is used to supply the inerting atmosphere. However, before the flue gas can be used for this purpose, it has to be cooled and scrubbed with seawater to remove $SO_2$ and $SO_3$ to minimize corrosion in the cargo tanks. Here the seawater contains sulfur predominantly in the sulfite form.

The conversion of sulfite and bisulfite ions to non-polluting sulfate ions does not require conditions as severe as does the oxidation of sulfides, polysulfides and polythionates. Examples of such severe conditions are found in coassigned U.S. Pat. No. 3,761,409 issued Sept. 26, 1973, which discloses a process for the air oxidation of sour water containing sulfides and intermediate sulfur compounds such as thiosulfates, tetrathionates, polythionates, sulfites and polysulfides to sulfate by adjusting the pH of the water to between about 6 to 13, heating the water to a temperature ranging from about 250° to 520° F; oxidizing the heated water under a pressure of around 75 to 800 psig at a liquid hourly space velocity of between 0.5 to 12.0 volume of feed per reactor void volume with a non-catalytic, oxidizing medium containing from 0 to 500% excess oxygen basis stoichiometric conversion of sulfide to sulfates and recovering an effluent containing substantially no other anion than sulfate.

SUMMARY OF THE INVENTION

It has now been discovered that a stream of the type herein described and containing substantially only sulfite and bisulfite ions can be treated under considerably milder conditions than set forth in the above-mentioned patent to achieve conversions in excess of 99 percent of sulfite and bisulfite to sulfate. The process of the instant invention accordingly comprises the steps of: heating the sulfite and bisulfite-containing stream to a temperature ranging from about 150° to about 250° F; oxidizing the heated stream under a pressure of around 25 to 50 psig at a liquid hourly space velocity of between 0.5 to 12.0 volumes of feed per reactor void volume with a non-catalytic oxidizing medium containing from 50 to 350 percent excess oxygen basis stoichiometric conversion of sulfite to sulfate and recovering an effluent containing no other anion than sulfate.

DETAILED DESCRIPTION OF THE INVENTION

In the present process, the preferred operating temperature is around 200° F since this temperature minimizes air compressor size and costs.

The oxidation can be carried out by counter- or cocurrent flow of the stream and of the oxidizing medium using apparatus of the type described in the forementioned U.S. Pat. No. 3,761,409; or in a suitable contacting tower.

The present process is continuous and does not require pH control to promote the oxidation of sulfite and bisulfite to sulfate nor does it require the addition of expensive chemical catalysts or the use of complex processing equipment.

Complete oxidation of the scrubbing liquor can be attained at relatively moderate conditions. At 200° F and 50 psig, with 100–125 percent excess oxygen based on conversion of sulfite to sulfate, and a 5 Liquid Hourly Space Velocity 99+% of the sulfite and/or bisulfite is oxidized to sulfate. By decreasing the temperature to 175° F and increasing the percentage of excess air to 230% essentially complete conversion can also be obtained. Oxidation of the scrubbing liquor under moderate conditions produces a low COD effluent suitable for discharge in areas where the dissolved solids content of the effluent is not critical.

Suitable basic chemicals including but not limited to NaOH and $NH_3$ can be added to the water to increase the affinity of the water for sulfur dioxide.

The invention is further illustrated in a non-limiting sense by the following examples.

EXAMPLES 1–12

A scrubbing liquor having the following composition was used:

| Component | Weight percent |
|---|---|
| $Na_2SO_3$ | 1.03 |
| $NaHCO_3$ | 6.51 |
| $H_2O$ | 92.46 |

Air and this liquor (pH 8.1) were fed cocurrently downward through a reactor which was packed with 3 mm glass beads.

Oxidation runs were made with the scrubbing liquor under a wide variety of conditions. Table I, lists the results of runs of major interest. Each of the oxidation parameters studied can be seen to affect the conversion of sulfite to sulfate; increases in any of the oxidation parameters of temperature, pressure, or percentage excess air results in an increase in conversion to sulfate.

Thus it is possible to attain complete conversion at a variety of conditions by increasing the level of one or two of the parameters to compensate for a decrease in the level of the third parameter.

TABLE I

| Examples | Temp. °F. | Pressure, psig | % Excess Air | Conversion[a] to SO$_4$ |
|---|---|---|---|---|
| 1 | 200 | 0 | 133 | 15 |
| 2 | 80 | 0 | 371 | 31 |
| 3 | 85 | 50 | 125 | 55 |
| 4 | 200 | 25 | 144 | 75 |
| 5 | 150 | 50 | 129 | 82 |
| 6 | 175 | 50 | 133 | 90 |
| 7 | 225 | 25 | 135 | 95 |
| 8 | 150 | 50 | 350 | 97 |
| 9 | 175 | 50 | 230 | 99+ |
| 10 | 175 | 50 | 340 | 99+ |
| 11 | 200 | 50 | 125 | 99+ |
| 12 | 250 | 50 | 132 | 100 |

[a]Based on ppm SO$_4$ (as S)/ Total ppm Sulfur

The pH of the unoxidized scrubbing liquor was 8.1 whereas after oxidation the pH had increased slightly to 8.5. Hence no pH adjustment of the effluent is required before discharge, nor would special metallurgy be needed for the oxidizer. If possible the tail gas should not contain any H$_2$S in order to minimize the oxidation conditions required to treat the tail gas scrubbing liquor. If H$_2$S is present in the tail gas, combustion of the H$_2$S to SO$_2$ may be required.

EXAMPLE 13

Sea water from flue gas scrubbing is treated as in the above examples. The water is already at 150° F when contacted with air and the sulfite is rapidly oxidized to sulfate. The treatment is carried out in a small tricklebed reactor containing suitable packing to provide large surface area for transfer of oxygen to water.

EXAMPLE 14

In another run, 1 percent caustic is added to the scrub water before it is contacted with the flue gas. This step reduces the amount of sea water required since more SO$_3$ and SO$_2$ can be removed by water if this water has a higher pH.

EXAMPLE 15

An aqueous solution containing 10 wt % sodium sulfite was contacted with air in a continuous flow reactor packed with 3 mm glass beads. At oxidizing conditions of 250° F, 100 psig, with 125% excess oxygen based on oxidation of sulfite to sulfate, and a 5 Liquid Hourly Space Velocity based on the void volume of the reactor, complete conversion of sulfite to sulfate was obtained.

EXAMPLE 16

An aqueous solution containing 1 wt % sodium bisulfite and 4 wt % sodium sulfite was contacted with air under conditions set forth in Example 15. Complete conversion of bisulfite and sulfite to sulfate was obtained.

EXAMPLE 17

An aqueous solution containing 10 wt % sodium bisulfite was contacted with air under conditions set forth in Example 15. Complete conversion of bisulfite to sulfate was obtained.

The process of the invention can be used with various scrubbing liquors including those originating from flue gas or stack gas desulfurization, as well as tail gas scrubbing liquors from the Claus sulfur recovery process.

While the invention has been illustrated with respects to certain features thereof, these are exemplary only and the scope of the invention is limited only by the subjoined claims.

What is claimed is:

1. In a continuous process for the liquid phase oxidation of water containing substantially only sulfite and/or bisulfite ions, the steps of: heating said water to a temperature of about 150° to 250° F; oxidizing the heated water under a pressure of around 25 to 50 psig at a liquid hourly space velocity of between 0.5 and 12.0 volumes of feed per reactor void volume with a non-catalytic, oxidizing medium containing from 100 to 350 percent excess oxygen basis stoichiometric conversion of sulfite and bisulfite ions to sulfate ions and recovering an effluent containing substantially no other anions than sulfate.

2. The process of claim 1, wherein said oxidizing is carried out by counter current flow of said water and said oxidizing medium.

3. The process of claim 1, wherein said oxidizing is carried out by cocurrent flow of said water and said oxidizing medium.

4. The process of claim 1, wherein said water is scrub sea water from tanker inerting operations.

5. The process of claim 1, wherein said water is oxidized at around 200° F and 50 psig with 100 to 125 percent excess air and a 5 volume liquid hourly space velocity.

6. The process of claim 1, wherein said oxidizing medium is oxygen, air or oxygen-enriched air.

7. The process of claim 1, wherein said water is tail gas scrubbing liquor from the Claus sulfur recovery process.

8. The process of claim 1, wherein suitable basic chemicals are added to said water to increase the affinity of the water for SO$_2$.

9. The process of claim 8, wherein the said water is scrubbing liquor for flue gas or stock gas.

10. The process of claim 8, wherein said chemicals are NaOH or NH$_3$.

* * * * *